Sept. 7, 1954 W. MORTON ET AL 2,688,180
RAILROAD TRACK TREAD REPAIRING PROCESS
Filed Oct. 22, 1949 2 Sheets-Sheet 1

INVENTORS
WILLIAM MORTON
ARTHUR R. LYTLE
BY
ATTORNEY

Sept. 7, 1954   W. MORTON ET AL   2,688,180
RAILROAD TRACK TREAD REPAIRING PROCESS
Filed Oct. 22, 1949   2 Sheets-Sheet 2
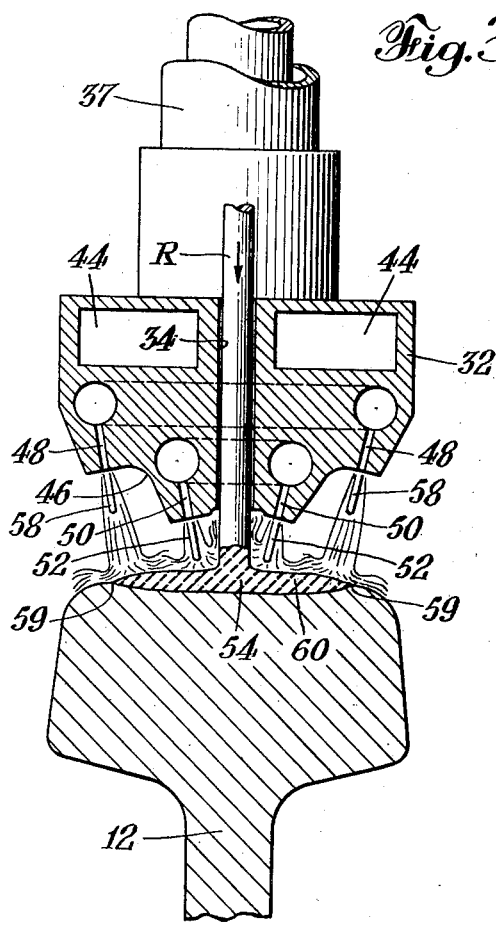
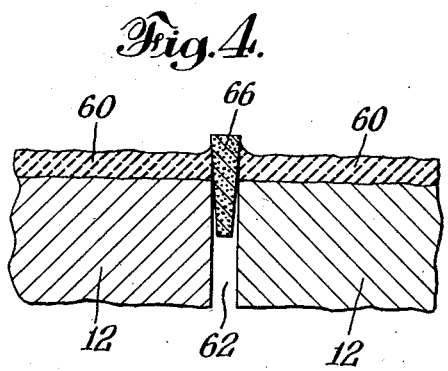
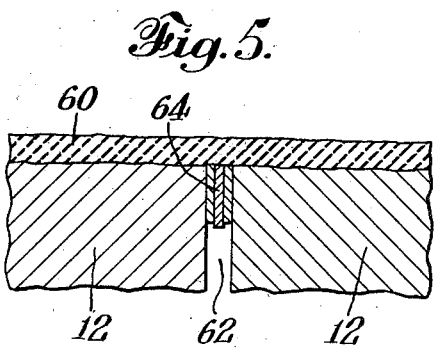
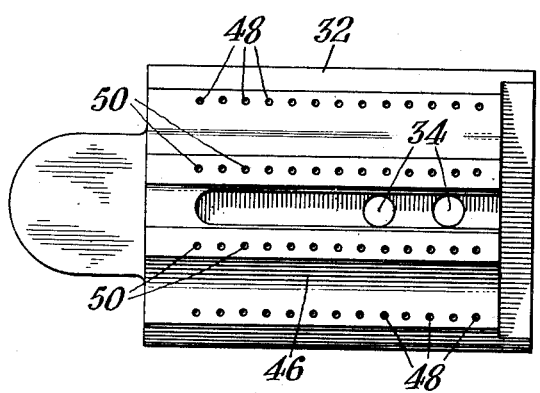
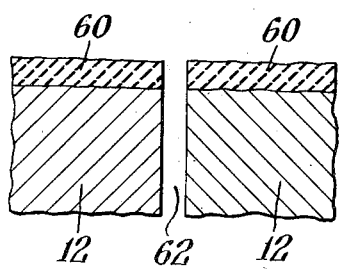
INVENTORS
WILLIAM MORTON
ARTHUR R. LYTLE
BY
D.C. Harrison
ATTORNEY Patented Sept. 7, 1954

2,688,180

UNITED STATES PATENT OFFICE 2,688,180

RAILROAD TRACK TREAD REPAIRING PROCESS

William Morton and Arthur R. Lytle, Niagara Falls, N. Y., assignors, by mesne assignments, to Union Carbide and Carbon Corporation, a corporation of New York Application October 22, 1949, Serial No. 122,978

3 Claims. (Cl. 29—169)

This invention relates to the art of building up battered, worn and otherwise depressed portions in the tread of steel rails in railroad tracks.

While not limited thereto, the invention is more specifically concerned with "bead" or "strip" welding of the type disclosed by Harry S. George in Patent 2,186,966, in which a depression in a rail is built up with additional metal welded in place by the oxy-acetylene process to provide a repaired tread that is somewhat restricted in width.

In the past such work was done manually by an individual welder, who, holding a rod of metal in one hand and an oxy-acetylene welding blow-pipe in the other, crouched over the rail in an awkward and tiring position. After the weld metal was deposited, prompt levelling was necessary before a train passed over the repaired rail. Such work was laborious, time-consuming, and dependent upon the skill of the individual.

The main objects of this invention are to provide an improved method of repairing driver burns, and battered ends of steel rail treads in situ by building up the depressed portions thereof with added metal welded in place, which method, compared to the prior art, is less laborious, simpler, more economical, and faster; to provide a novel semi-automatic machine for carrying out such method, which is effective and efficient in operation, compact and relatively light in weight; and to obtain a strip weld of improved quality, uniform hardness, smooth surface, fine grain size, sound and good appearance, without underfilling or undercutting between the base metal and the weld metal adjacent the edge of the latter. Other objects will be obvious to those skilled in the art from the following description.

The invention comprises a novel method and novel apparatus for semi-automatically welding a strip or bead of metal to the running surface for the purpose of building up worn rail ends, repairing damage due to driver burns, or correcting other faults that develop on the bearing surface of rails. The apparatus comprises a novel multiple flame blowpipe head and welding rod guide, and automatic mechanism for causing transverse oscillation and longitudinal travel of the blowpipe head and rod guide over the rail, together with suitable gas supply and regulation equipment. The method includes continuously depositing weld metal in a single pass under conditions such that no undercutting or underfilling develops at either the starting or stopping points, and includes novel bridge means placed in the joint between the ends of rails to aid in crossing an open joint by a single pass of the welding process.

In general, according to the invention, there is provided a process of repairing steel rail treads in situ which comprises applying a bank of oxy-acetylene flames against the tread and simultaneously moving them horizontally back and forth at a regular rate transversely of the tread while advancing the flames longitudinally of the rail tread until the surface of the tread metal fuses. The longitudinal speed of advance is then increased while continuing with such regular transverse movement thereof, so that the lower end of at least one rod, guided so that it is free to feed itself downward by gravity, can be rested against the tread, melts progressively and thereby deposits and welds a strip of metal on the depressed portion of the tread. At the finish of the welding operation at the other end of such depressed portion, the rod or rods are raised and the flames are extinguished. At open joints the opening is closed with one or more heat-conductive members, steel or graphite, and the welding operation is carried across the same without interruption.

The invention provides many advantages over manual welding for building up driver burns or battered rail ends. Among the principal advantages are faster rate of metal deposition, particularly for deep deposits, greater uniformity of composition of deposited metal, definite control of width, and lack of dependence on the skill of the operator.

In the drawings:

Fig. 3 is a transverse sectional view through the work and head;

Figs. 4 and 5 are longitudinal sectional views of joint bridging modifications;

Fig. 6 is a similar view of the finished joint; and

Fig. 7 is a bottom view of the blowpipe.

Figure 1:
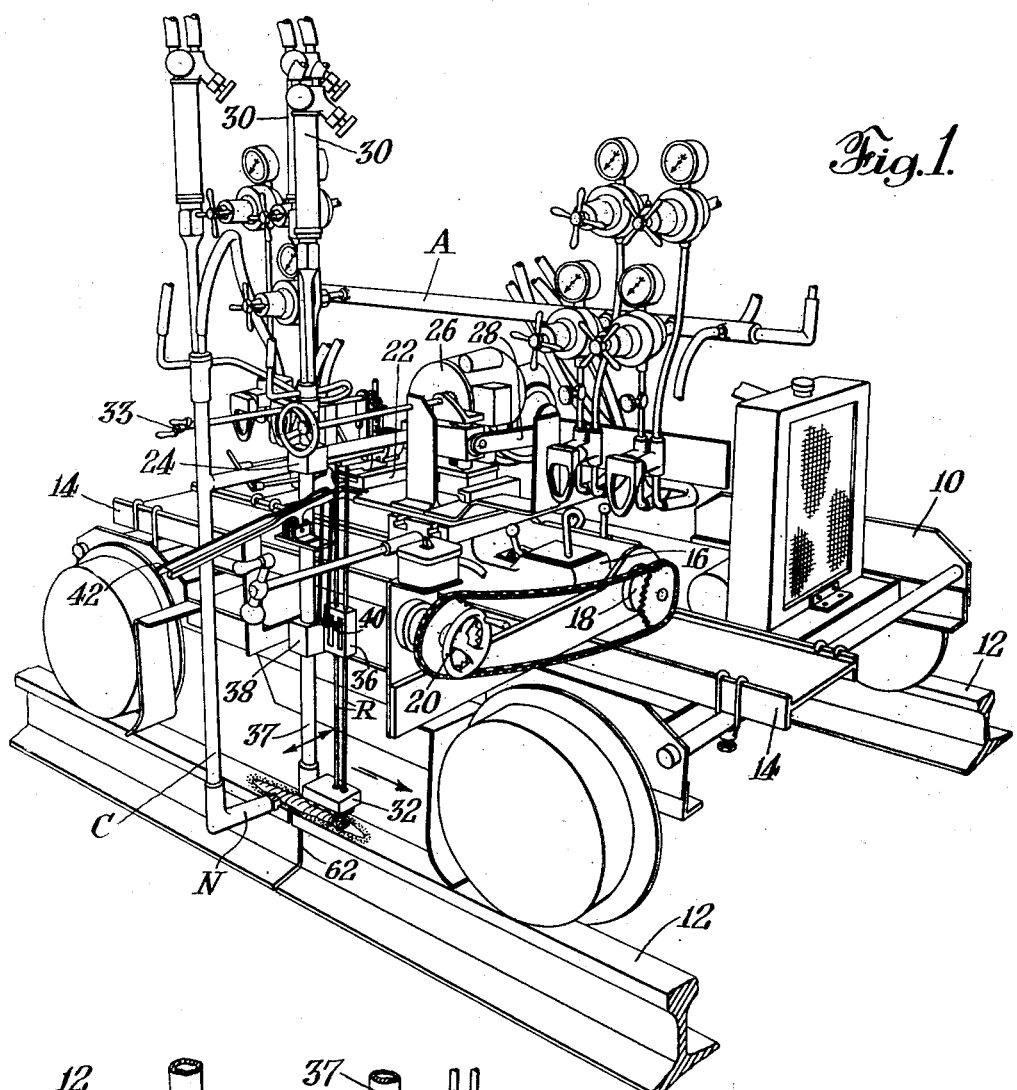
Fig. 1 is a perspective view of apparatus illustrating the invention.

As shown in the drawings, the apparatus A is mounted on a small, self-powered car 10 which is adapted to run on the rails 12 of the railroad track under repair. Such apparatus includes a longitudinal track 14 extending parallel to the rails 12 on which is mounted a motor-driven carriage 16, the speed of which is adjustable and controlled by suitable rheostat means 18 including a handle 20. In normal operation the speed of the carriage is about 4 inches per minute. The carriage 16, in turn, supports a transverse track 22 on which is mounted a blowpipe carrier 24. The carrier 24 is reciprocated by a mechanical movement including a motor 26 which drives an adjustable crank-link connection 28 between the carrier 24 and the carriage 16. The speed of the motor 26 is adjustable through a suitable rheostat. In normal operation the carrier is oscillated at about 20 cycles per minute through a stroke of about ⅜ inch.

Mounted on the carrier 24 is a blowpipe assembly comprising two vertically disposed oxy-acetylene welding blowpipes 30 having a common head 32 located directly above the rail 12 which is to be repaired. The blowpipe assembly is vertically adjustable by suitable means including a handle 33. The head 32, as shown in Fig. 3, is provided with vertical passages 34 for welding rods R which are also guided by suitable ways in a box 36 located above the head 32 and fastened to the blowpipe stem 37 by a bracket 38. Rod clutches 40 in the box 36 are controlled by levers 42 to release, or elevate, or limit downward movement of the rods R at the will of the operator. The head 32 is also provided with chambers 44 for the circulation of cooling water, inasmuch as the head is exposed to considerable heat in operation.

The head 32 has a stepped face 46 containing four longitudinal rows of mixed oxy-acetylene gas outlet ports 48 and 50. The ports of the two rows on opposite sides of the center of the head are inclined inwardly and downwardly at included angles of about 20°. The oxy-acetylene flames 52 of the two inner rows 50 (which are fed with gas by one of the blowpipes 30) provide the heat for developing a molten base-metal puddle 54 and for melting the welding rod R, and those 58 of the two outer rows 48 (which are fed with gas by the other one of the blowpipes 30) provide suitable preheat and aid in preventing undercutting along the side edges 59 of the deposit. The outer rows 48 and the inner 50 are each supplied with a suitable mixture of oxygen and acetylene by the blowpipes 30.

In operation the apparatus welds a strip or bead 60 of metal continuously along the top surface of the rail at a relatively rapid rate in a single pass. The strip or bead 60 is very regular in contour, has a fine rippled surface, and is well united with the base metal, without any undercutting along the edges 59.

The welding rods preferably consist of an alloy composed of carbon 0.45%, manganese 1.05%, silicon 0.75%, chromium 0.80%, molybdenum 0.08%, vanadium 0.03%, sulphur and phosphorus 0.04% maximum, and the balance iron. However, any weld metal which is suitable for the purpose may be used.

Quite satisfactory continuous deposits can be made on both 112-lb. and 131-lb. R. E. rails at a speed of 3½ to 4 in. per minute with 40 lb. per sq. inch oxygen pressure on the outside two rows of flames and 60 lb. per sq. in. on the inside two rows of flames. The total gas consumption is about 345 cu. ft. per hour. Other rates of speed and oxygen pressures would be used for other-weight rails in proportion to their weight. Because of the high rate of heat input, little difficulty is encountered in starting the building-up operation. In actual tests, the deposit was started at a point about 6 in. from the end of the one rail, and the general procedure was to light the blowpipe and position it so that the forward end of the blowpipe was at the point at which it is wished to start the deposit. The speed of travel of the head was set for about 2 in. per minute until a weld bead was well developed. The rate of travel was then raised to 4 in. per minute and left at that speed until the finish of the weld on the other rail. If a moderately excess-acetylene flame was used, it was observed that the "sweating" started after the blowpipe had traveled about one-fourth of its length, and that the metal from the first welding rod flowed onto the rail very evenly and smoothly at about the midpoint of the blowpipe. The final bead solidified at a point about ½ in. behind the welding head and was relatively flat.

As shown in Fig. 5, the space 62 between the rail ends can be satisfactorily bridged by using multiple shims or strips 64 of suitable metal such as low-carbon steel. Enough of these are put in position, edgewise up, to be firmly tapped into the joint. In this way they are kept cool by conduction into the rail metal and serve very effectively to bridge this gap. In subsequent slotting operations, they fall loose as they are not welded any deeper than the deposit on the rail. With these strips 64 between the rail ends there is no appreciable effect of the presence of the rails ends on the welding operation.

Figure 2:
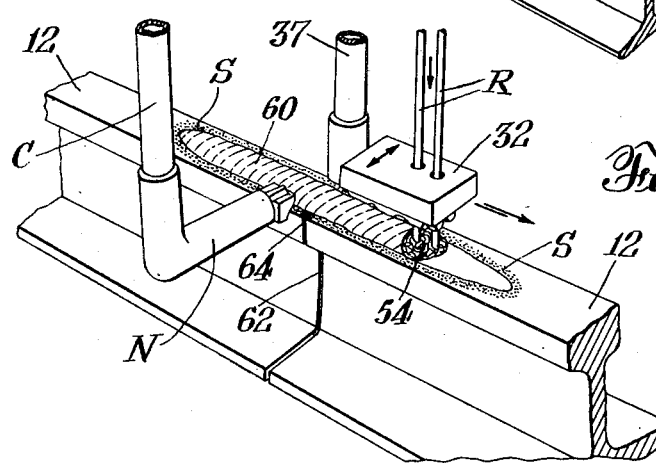
Fig. 2 is an enlarged fragmentary perspective view of the work and adjacent apparatus in operation.

The use of sillimanite, Alundum or other refractory paste as an insulating and stopping-off agent is recommended. The paste is painted on the rail just beyond the point at which the deposit is to stop. This insulates the rail and prevents it from melting and prevents the weld metal from flowing onto the rail where it is not wanted. This method is quite satisfactory. Moreover, it is not necessary to reduce the rate of speed at the end point, but merely to raise the rods out of position and shut off the blowpipes 30. No undercutting develops if this procedure is followed. Some tests have been made in which the sillimanite was applied on the rail for the full length of the deposit on the rail tread surface adjacent to the weld bead to be made, as shown at S in Fig. 2. In some tests this has been beneficial in maintaining a uniform and straight edge and may be desirable for field use.

Welds have been made in 112-lb. rails both with and without angle bars and it was found that the presence of angle bars did not have any appreciable effect on the performance of the apparatus. Although the rail head attained a dull red heat for the full thickness of the head, the penetration of the heat was rather slow and was not influenced by the presence of angle bars. The relative independence of the process on the weight of the metal underlying the head was shown by the fact that 131-lb. rails were built up under the same conditions and at the same welding speed as the 112-lb. rail.

Tests were made to determine whether the rail ends would be bowed out of shape by the heat of welding. For this test the bottom surfaces of two 3′ long rails were machined so that they would lie flat on a planer bed and gauge marks were set along the top edge. The rail ends were built up in a normal process and the rails were then laid again on the planer bed. No detectable bowing upward or downward of the rail end was observed, using calipers capable of indicating changes of the order of 0.01″.

Also mounted on the carriage 16 is a cutting blowpipe C which may, if desired, be used to trim the bead 60 to the proper level at any later time, or while the deposited metal is quite hot; the cutting nozzle N being located a fixed distance back of the welding head 32, and traveling therewith at the same speed. The cutting blowpipe, however, is preferably not normally so used for the reasons pointed out below.

Because of the high temperature of the weld deposit at any point within about four inches behind the welding head, it was found very difficult to produce a torch-cut surface which was of sufficiently good quality to warrant use of such method of trimming. The cutting of hot steel is usually accompanied by a wide kerf, and, in this trimming operation the cutting oxygen jet had a very strong tendency to flare upwardly, leaving an irregular surface on the rail. Moreover, the thin slice of metal which was removed by the cutting jet was quite frequently rewelded at points and was then only removable by chipping. When similar cutting operations were done on rails which had cooled below a red temperature, this thin slice had been quite easily removed.

A number of attempts were made to develop welding procedures whereby the deposited metal would be shallower and thus possibly would not require trimming with a cutting torch. In the first tests, deposits were made with a single 1/4" or 3/16" diameter welding rod. In these tests, the rod was positioned at various points in respect to the several welding flames, and the operation was varied by increasing or decreasing the amplitude of movement of the blowpipe transversely of the rail, and by increasing or decreasing the longitudinal welding speed. It was found that quite shallow and smooth deposits could be made with a single 3/16" or 1/4" diameter rod, but best results were obtained with the 1/4 in. rod. The deposits were only about 1 3/8" wide as compared with 1 1/2" wide deposits made with the two rods, but, as determined by surface gauge readings, the deposits were very close to 1/8" high, and quite uniform and of good appearance. A hardness survey of several deposits made with a single 1/4" diameter rod showed that the hardness was in the desired range of 340 to 360 Brinell.

By further study of the conditions of welding, it was found that the height of the deposit could be controlled to an appreciable extent by varying the two other factors; namely, the height of the blowpipe above the rail and the diameter of the rod guide in the blowpipe. In the previous tests, the blowpipe had been set for 5/8" above the rail head, and the rod guide block on the welding head had a 3/8" diameter hole for guiding the rod. It was observed that under such conditions the exhaust welding flames preheated the welding rod for a considerable distance above the welding head.

The welding head, therefore, was lowered to 3/8" above the rail surface, and the rod guide hole for 1/4" diameter rod was reduced to 9/32" which provided just sufficient clearance for the rod. These new conditions greatly reduced the amount of hot gases which played around and preheated the welding rod and also shortened the length of the rod which was immediately in contact with the welding flames. It was found that under such conditions, the deposit made with a single 1/4" diameter rod was on the order of 3/32" high and was of excellent appearance. The use of two rods lead to deposition of a layer about 1/8" high, also of excellent appearance.

An additional gain in respect to producing a shallow deposit is also provided by an increase in the welding speed from 4" to 4.75" per minute.

As a measure of the reduction in height in the deposit produced under such conditions, the amount of rod deposited per inch of weld was as follows:

| | Height of Deposit, in. |
|---|---|
| Single 3/16" diameter rod—0.016–0.020 lb./in. of deposit | 1/16–3/32 |
| Single 1/4" diameter rod—0.021–0.023 lb./in. of deposit | 1/16–3/32 |
| Two 1/4" diameter rods—0.029–0.033 lb./in. of deposit | 3/32–1/8 |

In actual railroad track tests where trimming was necessary, the rod consumption was 0.053 lb. per inch, and the deposit was on the order of 5/32" to 3/16" high. Therefore, on the basis of tests with a single 1/4" (diameter) rod, the height of the deposit was reduced by more than half, and, consequently, the need for trimming by torch cutting was entirely eliminated.

According to the invention, the space between the joints may first be filled with multiple strips of metal such as 1/16" thick by 1/2" wide steel shims 64 placed on edge between the rails 12 and tapped firmly into position, as shown in Fig. 5. An objection to the use of these shims is that during cross cutting after welding they may fall down and become lodged between the rail ends and thus endanger the life of the rail. On some railroads this is considered very objectionable. The material to be put in joints between the rails, therefore, should be either positively and completely removable, or else be of such a nature that it disintegrates completely and does not remain as a solid material between the rail ends.

The most obvious material for filling in the intervening space is a refractory cement. A large number of refractory cements were tried and, in use, they were applied between the rail ends in a manner so as to form a shallow basin between the two rail ends. Such refractories as magnesite and other high-temperature materials stood up quite satisfactorily and provided suitable means of filling in the space between the rail ends, except that because of the low heat conductivity of these materials and the high concentration of heat in the rail ends, the rail end metal had a very strong tendency to melt away. Thus, a deeper build-up was required. This condition was not satisfactory, as the immediate end of the rail was frequently not built up to the desired level. Tests were made in which a water-cooled copper strip was supported between rail ends, but difficulties arose due to the excessive chilling effect of this bar on the rail ends. The quality of the weld on the extreme end was occasionally defective, and, in most cases also, the weld metal would not flow up to the rail end and would not form a square edge. This lack of a square edge is not desirable in built-up rail ends.

The average refractory is unsatisfactory primarily because it is not "wet" by the steel and also partly because of its low heat conductivity, and most refractories are unsatisfactory because of their relatively low mechanical strength. On the other hand, graphite has the characteristics of a highly satisfactory material. Tests were, therefore, made in which a wedge of graphite 66 was placed between rail ends which were separated by about 1/4". The graphite wedge was placed so as to extend slightly above the surface of the rail in the manner shown in Fig. 4. When the welding was done, it was found that the weld metal 60 built up against the face of the graphite wedge on both sides of the joint and that the graphite wedge satisfactorily withstood the extreme heating conditions that prevailed at this particular point. Due to its good heat conductivity, it prevented the ends of the rails from overheating. Tests were made in which rails were spaced from 3/16" to 1/2", the intervening space being filled by one or more graphite members. In each case, no difficulty was encountered in the building-up operation, and the weld metal built up square on the ends of the two rails.

Since graphite and carbon are soluble in steel, it was necessary to determine the effect on the carbon content and hardness of the deposited weld metal due to the proximity of this graphite wedge to the molten metal. It was observed that there was a slight wearing away of the graphite wedge during the passage of the blowpipe flames over it, but at least a major portion of this was due to flaking by the flames, rather than solution in the molten metal. In order to check this further, a metallographic examination was made of several joints prepared in this manner, and hardness tests were made of the same rail ends. These indicated a moderate increase in hardness at the immediate end of the leaving rail, which is the only point that would be affected by carbon absorption from the graphite wedge. Metallographic examination also showed that there are two effects of the graphite wedge. In the deposited metal within about 3/8" of the rail end, there was some apparent carbon pickup as evidenced by higher carbon content microstructure. This is not very important, as evidenced by the hardness in that particular zone, and the amount of absorption is not greater than is sometimes caused by the use of an excess-acetylene flame. There was, however, a very thin zone on the face of the rail end where the hot solid steel had been in direct contact with the graphite wedge or strip. At this point, carbon absorption was very high, and a zone about 0.005" thick existed in which the carbon content was over 2%. Normally, such a steel would be brittle, and if existing in the rail joint after completion it might be objectionable. However, as all the joints are cross-ground immediately after welding, this metal is removed and thus does not influence the subsequent life of the rail.

The height of the deposit can be controlled to an appreciable extent by small variations in the setting of the welding head and also by the use of a single or of two welding rods. Welding with a single rod results in excellent-appearing weld deposit with a height above the rail that varies from $\frac{1}{16}$" to $\frac{3}{32}$". The use of two rods is effective mainly in increasing the depth to about $\frac{1}{8}$". These seem to be the minimum heights of deposits that can be readily applied with the present apparatus and technique, and represent an important reduction over the height of deposit produced under previous conditions.

On the basis of eight inch long joints, the time in minutes per joint has been reduced by the invention to about two and three-quarters, compared with eight by manual operation. By eliminating the trimming step, the oxygen consumption per joint has been reduced about 25%, and the joint-to-joint time by about 20%.

In joints where the steel shims cannot be used to bridge the gap between spaced rail ends, the use of graphite wedges is recommended and they should be placed to extend slightly above the rail surface. Under normal operation, the carbon pickup from these spacers is not excessive, and only a moderate increase in hardness occurs in the weld metal within about 1/4" of the rail end. In operations where steel shims are permitted, however, it is recommended that they be used in preference to graphite wedges.

We claim:

1. Process of building up battered and worn rail ends at the joints of railroad tracks which comprises inserting a highly heat-conductive member of the class consisting of graphite and steel in the joint between the rail ends, applying a bank of oxy-acetylene flames against the tread of one rail, supporting a rod of weld metal which hardens upon cooling without the need for heating and quenching or working on one end on such tread in the midst of such flames, reciprocating the rod and flames transversely of the rail, melting the end of such rod and the tread metal with the flame, advancing the transversely reciprocating rod and flames longitudinally of the tread and across the inserted member in the joint, thereby welding a strip of added metal on the rail ends, which strip bridges such member, finally stopping the rod feed and the application of the flames, and removing the member and adjacent metal from the joint.

2. In the art of building up battered and depressed portions in the tread of rails at the joints in a railroad track, with weld metal by the oxy-acetylene process, the improvement which comprises inserting a wedge of graphite in the joint, which extends above the level of the tread, welding a strip of metal which hardens upon cooling without the need for heating and quenching or working by the oxy-acetylene process on the depressed portions of the rail tread, by starting the welding operation at one end of such portions on one rail and continuing the operation without interruption to the other end of such portions on the other rail of the joint, and removing said wedge.

3. In the art of building up battered and depressed portions of rails at the joints in a railroad track, with weld metal by the oxy-acetylene process, the improvement which comprises wedging steel shims in the joint, welding a strip of weld metal which hardens upon cooling without the need for heating and quenching or working longitudinally of the tread on the depressed portions by the oxy-acetylene process, by starting the operation at one end of the depression and continuing it without interruption across the shims to the other end of such depression, and removing said shims.

References Cited in the file of this patent

UNITED STATES PATENTS

| Number | Name | Date |
|---|---|---|
| 1,233,452 | Davis | July 17, 1917 |
| 1,477,538 | Carter | Dec. 18, 1923 |
| 1,613,326 | Krebs | Jan. 4, 1927 |
| 1,878,136 | Hasse | Sept. 20, 1932 |
| 1,893,093 | Linville | Jan. 3, 1933 |
| 1,933,139 | Daley | Oct. 31, 1933 |
| 1,938,819 | Eskilson | Dec. 12, 1933 |
| 1,976,526 | Tracey | Oct. 9, 1934 |
| 1,979,244 | Anderson | Nov. 6, 1934 |
| 1,987,341 | Kachel | Jan. 8, 1935 |
| 2,018,258 | Hartley | Oct. 22, 1935 |
| 2,040,062 | Ost | May 5, 1936 |
| 2,071,808 | Anderson | Feb. 23, 1937 |
| 2,075,810 | George | Apr. 6, 1937 |
| 2,115,127 | Smith | Apr. 26, 1938 |
| 2,149,861 | Morton | Mar. 7, 1939 |
| 2,181,974 | Kehl | Dec. 5, 1939 |
| 2,186,966 | George | Jan. 16, 1940 |
| 2,258,670 | Anderson | Oct. 14, 1941 |
| 2,267,296 | Bennewitz | Dec. 23, 1941 |
| 2,305,711 | Jones | Dec. 22, 1942 |
| 2,399,646 | Linden | May 7, 1946 |
| 2,441,176 | Wilson | May 11, 1948 |
| 2,510,083 | Davis | June 6, 1950 |
| 2,558,411 | Austin | June 26, 1951 |